United States Patent [19]

Smith et al.

[11] Patent Number: 4,464,648
[45] Date of Patent: Aug. 7, 1984

[54] DISPLAY PANEL FOR AIRCRAFT PARKING

[75] Inventors: Cecil B. Smith, Tucker; Finis E. Fox, East Point, both of Ga.

[73] Assignee: Delta Airlines, Inc., Atlanta, Ga.

[21] Appl. No.: 285,208

[22] Filed: Jul. 20, 1981

[51] Int. Cl.³ .............................................. B64F 1/22
[52] U.S. Cl. .............................. 340/51; 244/114 R; 248/50; 340/815.1; 340/945
[58] Field of Search .......... 340/815.01, 815.1, 815.21, 340/815.02, 51, 26, 25; 244/114; 248/50

[56] References Cited

U.S. PATENT DOCUMENTS

| | | | |
|---|---|---|---|
| 2,330,835 | 10/1943 | Miller | 248/50 |
| 2,885,538 | 5/1959 | Marion et al. | 248/50 |
| 3,662,232 | 5/1972 | Zechnowitz et al. | 340/51 |
| 3,674,226 | 7/1972 | Wasson | 340/26 |
| 3,729,262 | 4/1973 | Snead et al. | 340/26 |
| 3,767,309 | 10/1973 | Brown et al. | 340/26 |
| 3,843,263 | 10/1974 | Snead | 340/26 |
| 3,873,210 | 3/1975 | Konopka | 340/26 |
| 4,015,235 | 3/1977 | Demaine et al. | 340/51 |
| 4,184,655 | 1/1980 | Anderberg | 340/51 |
| 4,249,159 | 2/1981 | Stasko | 340/51 |

Primary Examiner—Glen R. Swann, III
Attorney, Agent, or Firm—David H. Semmes; Warren E. Olsen

[57] ABSTRACT

Visual displays for aircraft parking, particularly a composite signal light display having red, yellow and green lights and an adjacent parking light display for signalling aircraft alignment or misalignment with respect to an aircraft terminal passenger ramp of "gate". The parking light display includes linearly separated green and red neon tubes. The display includes an opaque background panel which is secured upon an air terminal exterior, so as to support simultaneously the red, yellow and green signal lights in vertical orientation and the linearly separated green and red neon tubes in vertical parallel with the signal lights. Misalignment of the aircraft with respect to the terminal gate is visualized by the pilot as the green neon tube being laterally displaced to left or right of the red neon tube. A hand held override switch is provided, such that the ground personnel may activate the red, yellow or green signal lights, so as to signal aircraft advance or stopping, as the gate is approached.

9 Claims, 13 Drawing Figures

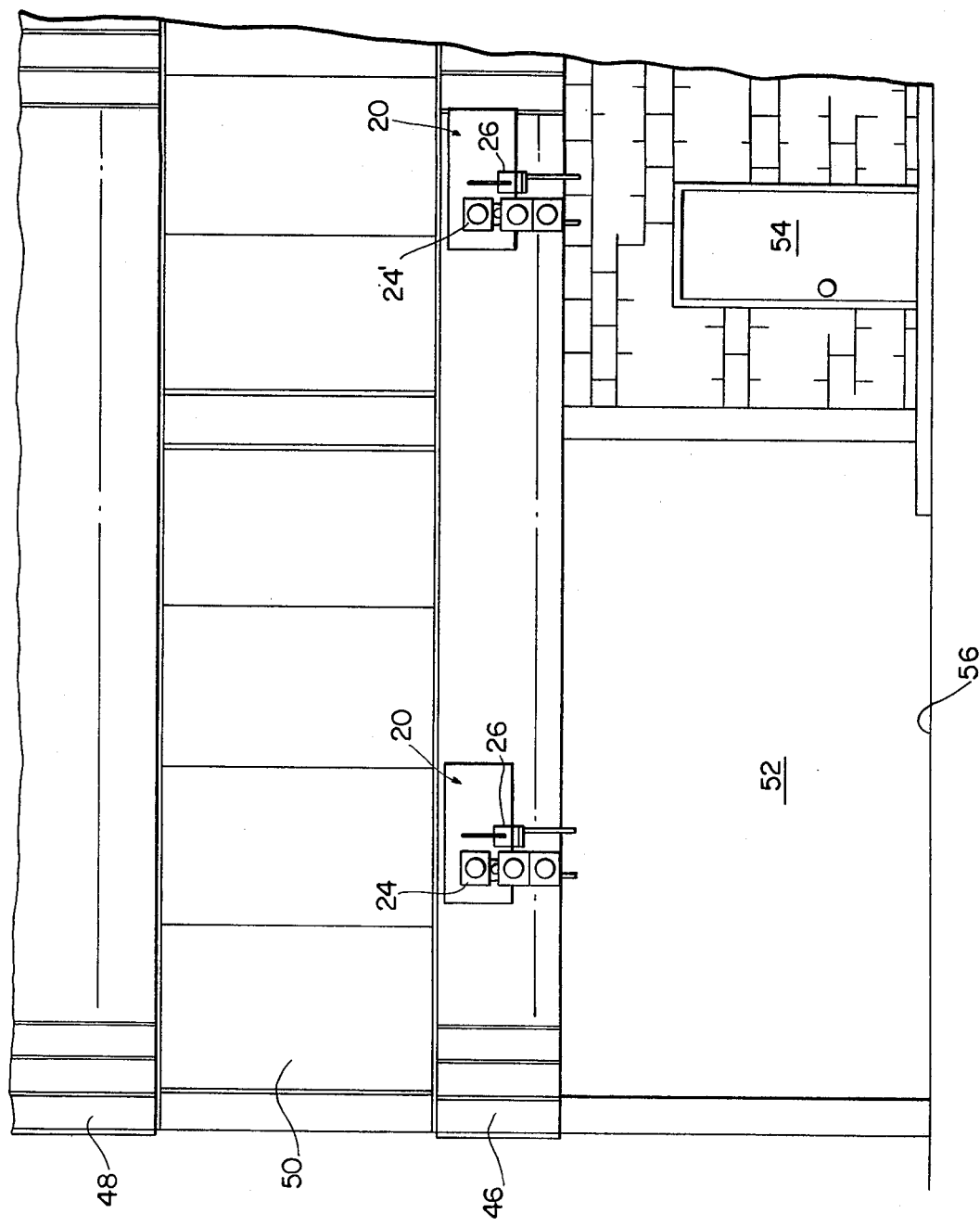

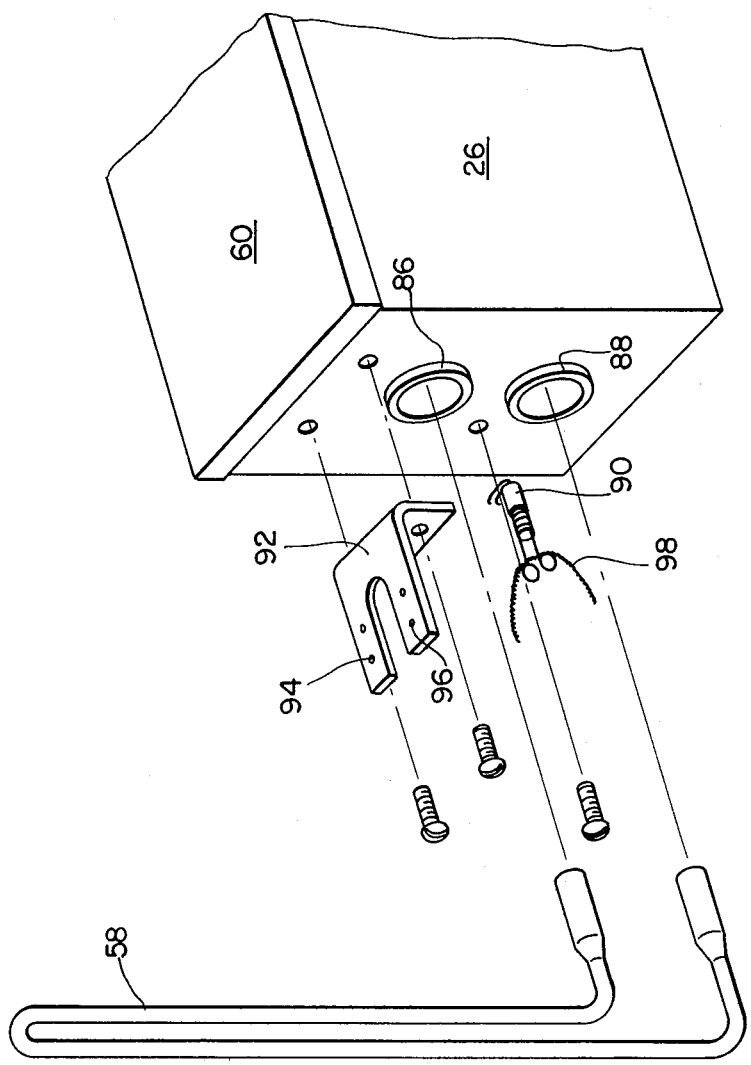
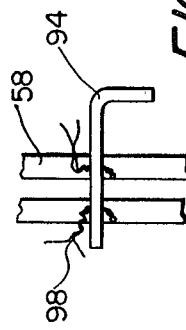
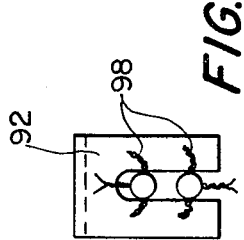

DISPLAY PANEL FOR AIRCRAFT PARKING

(1) FIELD OF THE INVENTION

Guidance systems for parking of aircraft at aircraft terminal buildings. Particularly, a display panel having red, yellow, green signal lights for signalling aircraft advance and stopping and an associated parking light display, for signalling aircraft alignment or misalignment with respect to the terminal gate.

SUMMARY OF THE INVENTION

According to the present invention, an opaque background display panel is affixed to the air terminal building exterior and includes both a vertically oriented signal light display housing having red, yellow and green lights to signal advance and stopping of the aircraft with respect to the gate, and a parking light display housing, including a linearly separated first green neon tube and a second red neon tube vertically aligned in parallel with the signal lights. The red, yellow and green signal lights are actuated by ground personnel to signal advance or stopping of the approaching aircraft. The aircraft pilot simultaneously visualizes alignment or misalignment of the aircraft, accordingly as the first and second neon tubes are aligned or laterally displaced with respect to each other. The background panel includes special brackets for rigidized support of the signal lights in vertical orientation and the neon tubes in linearly separated orientation. The red or "stop" signal light and both neon tubes are superposed with respect to the background panel.

DESCRIPTION OF THE DRAWINGS

FIG. 4 is a similar elevational view, showing the dual gate display panel affixed to the exterior of a conventional aircraft terminal building.

FIG. 7 is a fragmentary exploded view, showing fitting of the first neon tube into the parking light housing by means of tube support sockets and right angular bracket with flexible safety wire mounted in the housing.

FIG. 11 is a front elevation of the plastic guide bracket 92.

FIG. 12 is a fragmentary side elevation thereof.

DESCRIPTION OF THE PREFERRED EMBODIMENTS

Figure 1:
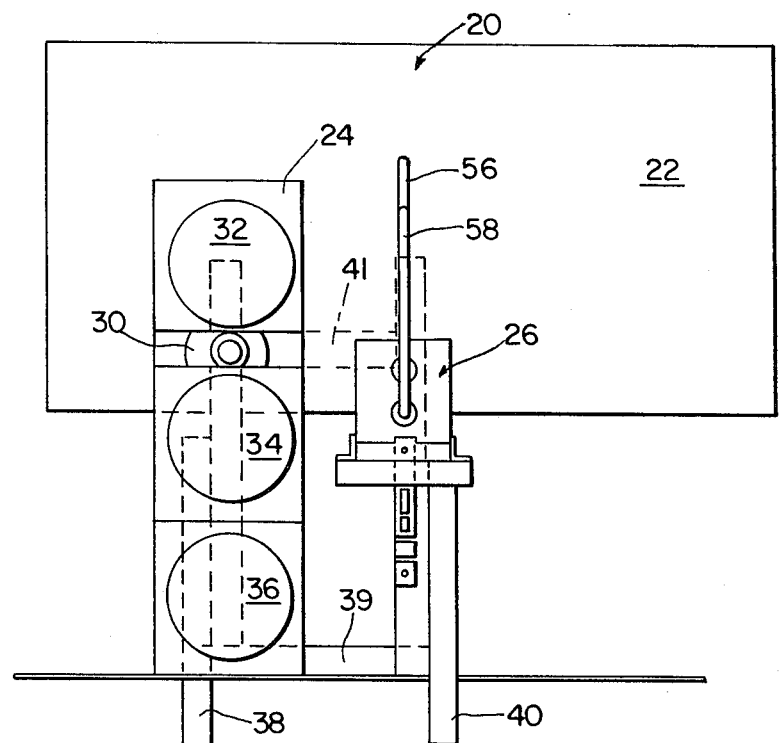
FIG. 1 is a front elevation of the display panel for aircraft parking, showing the first and second neon tubes in vertical alignment and thereby signaling the aircraft pilot that his aircraft is in appropriate alignment with the gate.
Figure 10:
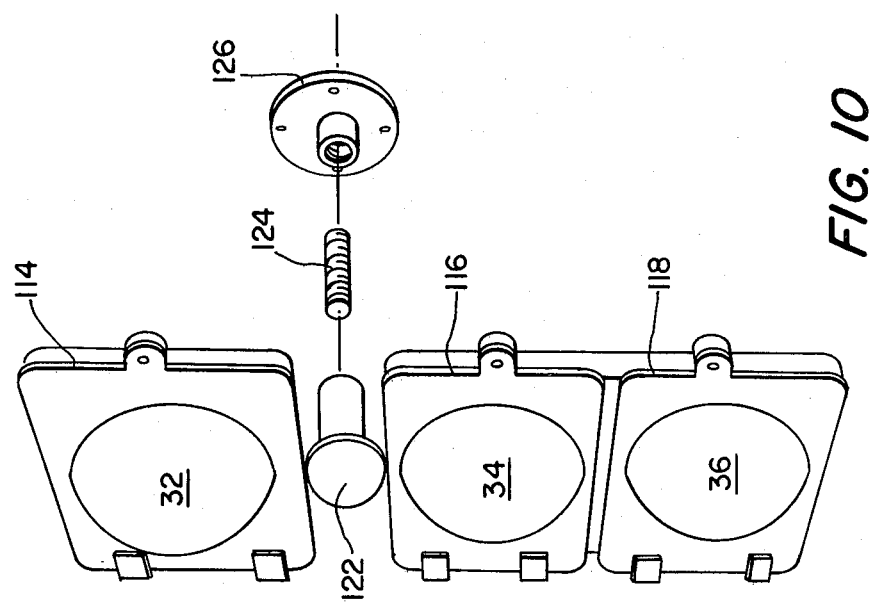
FIG. 10 is an exploded view of the vertically oriented signal light display, including its "Tee" connection with the opaque background panel.

In FIG. 1, display panel 20 is generally indicated as comprising opaque background panel 22, supporting vertically oriented signal light housing 24 having red, yellow and green signal lights 32, 34 and 36 and parking light display housing 26, including first green neon tube 58 and second red neon tube 56. An angle iron frame assembly 38, 39, 40, 41 may be utilized to support the opaque background panel 22 with respect to a terminal building horizontal beam or mantel. A connector assembly 30, including (as shown more fully in FIG. 10) floor flange 126, threaded close nipple 124 and "Tee" connector 122, or the like, may be used to secure the signal light display housing 24 to the opaque background panel 22.

Figure 2:
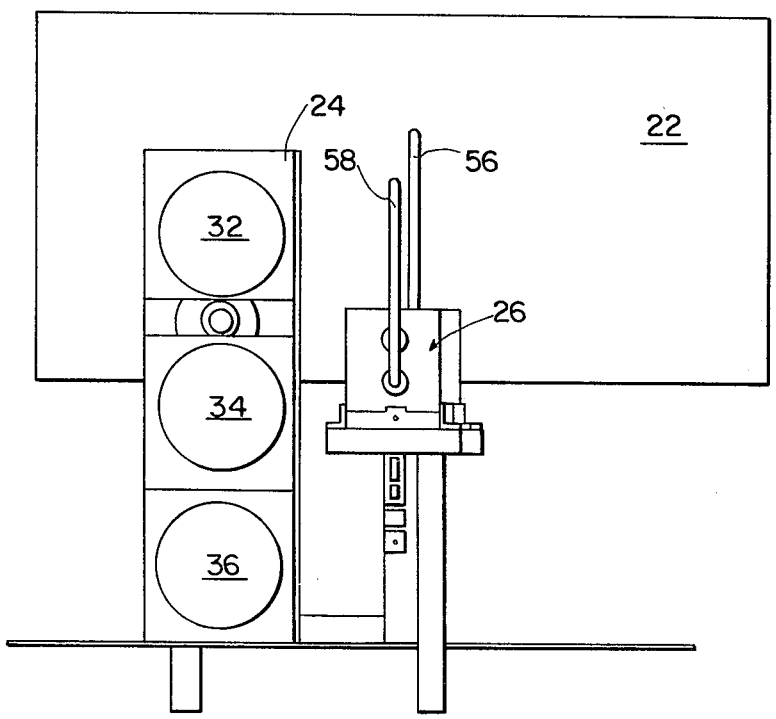
FIG. 2 is a similar elevation, showing the first neon tube laterally displaced to the left of the second neon tube and indicating to the pilot that his aircraft is misaligned to the right of the gate.
Figure 3:
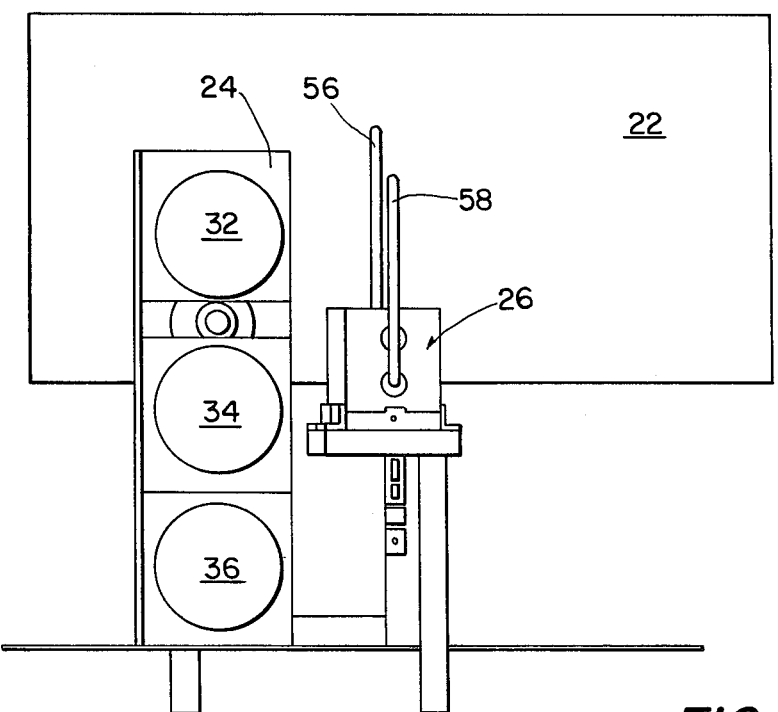
FIG. 3 is a similar elevational view, showing the first neon tube laterally displaced to the right of the second neon tube, indicating to the pilot that his aircraft is misaligned to the left of the aircraft gate.

FIGS. 2 and 3, respectively, illustrate misalignment to the right and to the left of the aircraft gate. In FIG. 2, first or green neon tube 58 is laterally misalinged to the left of the second or red neon tube, 56, and in FIG. 3 the first neon tube 58 is laterally misaligned to the right of the second tube 56.

In FIG. 4 an aircraft terminal gate is illustrated as including breezeway 52, defined above apron level 56, as well as metal siding elements 46, 48, accoustical glass 50 and ground personnel entrance 54.

Figures 5, 5A:
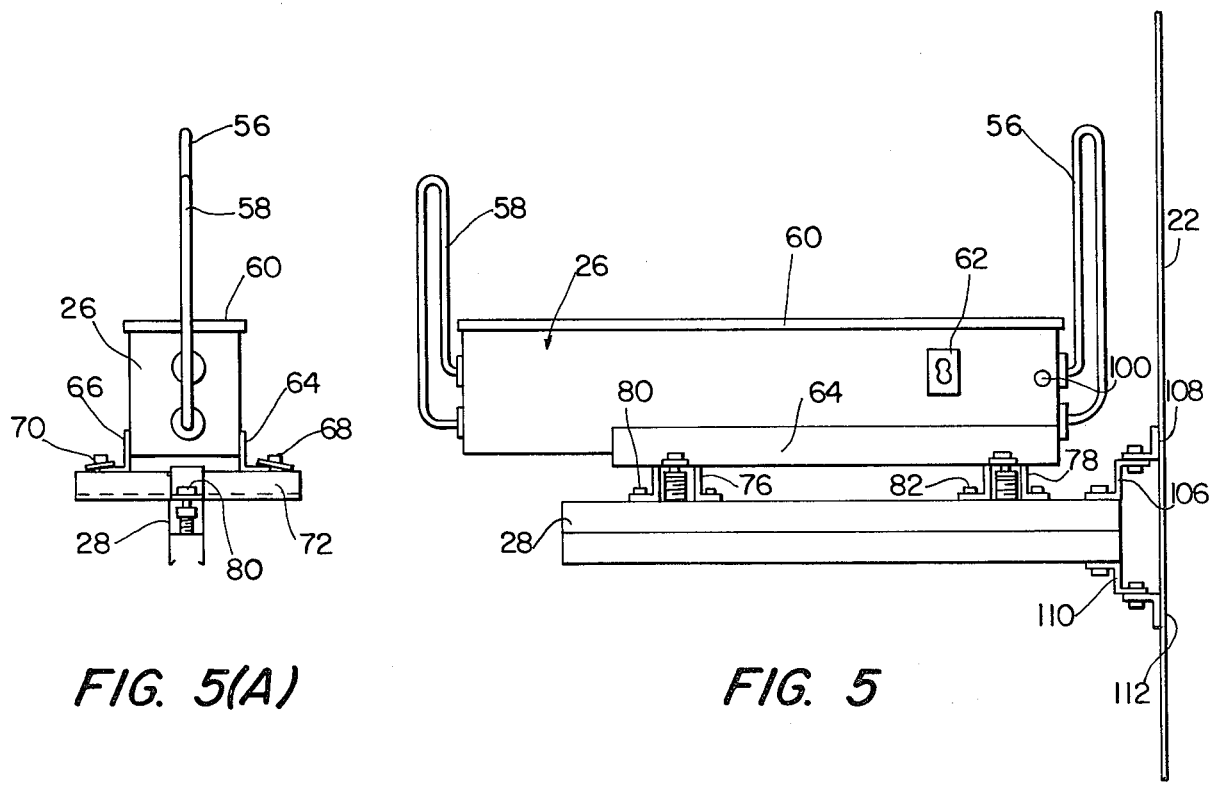
FIG. 5 is a side elevational of the parking light display housing which supports the first green neon tube and the second red neon tube.
FIG. 5(a) is an end elevational of the parking light display housing with the first green neon tube and the second red neon tube aligned.

In FIGS. 5 and FIG. 5A, first neon tube 56 and second neon tube 58 are illustrated as supported within housing 26 which includes removable cover 60, toggle switch 62 and line adaptor socket 100. Housing 26 is mounted upon a pair of transverse channels (one of which, 72, is illustrated in FIG. 5(a)) by means of longitudinally extending channels 64, 66 and bracket elements 76, 78 which, in turn, are secured to longitudinally extending channel 28 by means of bolt elements 80, 82. The individual channels 64, 66 may be secured to the transverse channels by means of conventional bolt and spring nut assemblies 68, 70. Each transverse channel is in turn secured to the longitudinal channel 28 by means of bolt and spring nut assemblies (for example, 80, 82, in FIGS. 5 and 5(a)).

Longitudinal channel 28, in turn, may be secured to opaque background panel 22 by pairs of brackets 106, 108 and 110, 112, such that housing 26 extends at right angles to opaque panel 22 and presents a line of sight display for the approaching aircraft.

Figure 6:
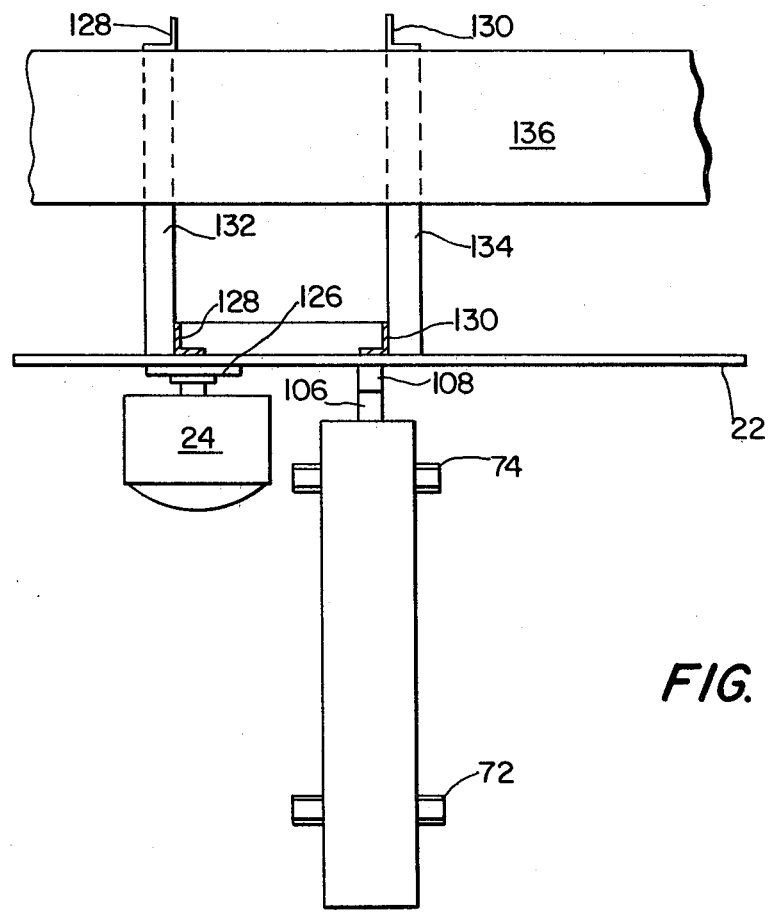
FIG. 6 is a top plan of the display assembly, showing the signal light housing and the parking light housing mounted upon the opaque background panel.

In FIG. 6, opaque background panel 22 is illustrated as secured to terminal building beam 136 by means of $\frac{1}{8}"\times 2"\times 2"$ angle iron mounts 128, 130.

In FIG. 7 parking light display housing 26 is illustrated as including at each end neon tube sockets 86, 88, plastic guide bracket 92 including safety wire securement apertures 94, 96, and a threaded glass support rod 90 with safety wire 98 mounted in the neon tube sockets 86, 88. As illustrated in FIGS. 11 and 12, upper glass securement wire 98 may be employed to engage apertures 94, 96 and an upper portion of the neon tube 58, so as to rigidize the neon tube with respect to the housing.

Figure 8:
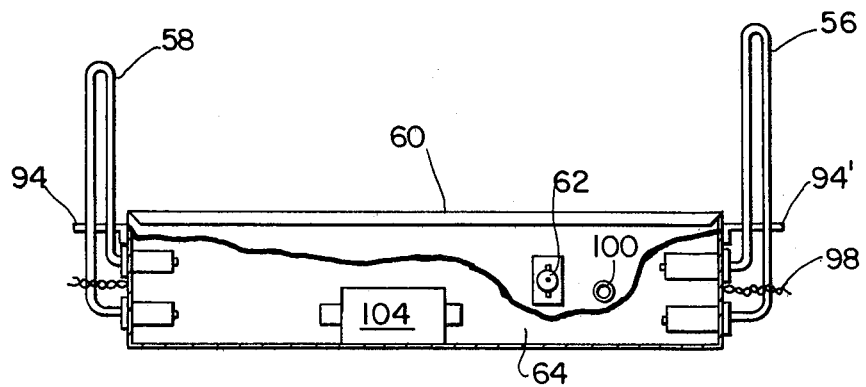
FIG. 8 is another elevational view (partially in phantom) of the signal light housing, showing the positioning of the transformer and neon tube socket elements.
Figure 9:
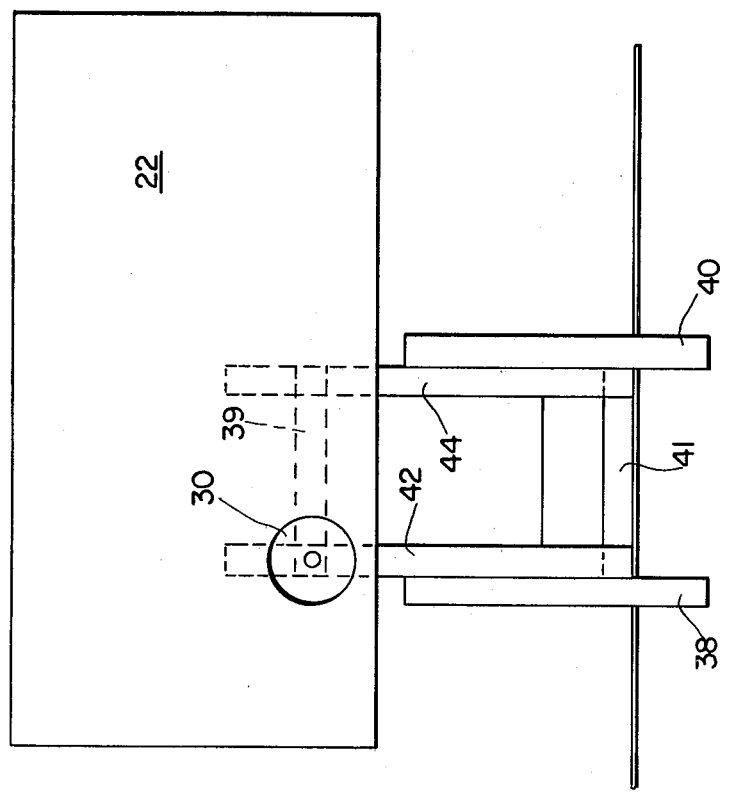
FIG. 9 is a front elevational view of the opaque background panel and support bracket assembly.

In FIG. 8 the parking light display housing is illustrated as further including interiorly mounted transformer 104. In FIG. 9, opaque background panel 22 is illustrated as including a vertically oriented frame composed of ⅛"×2"×2" angle iron members 38, 42, 40, 44, as well as transverse members 39 and 41. The entire assembly may be rigidized by bracket securement or welding of the downwardly extending angle iron members 38, 40 to a horizontal beam or mantel in the terminal building. The signal light display 24 is further illustrated in FIG. 10, as including integrated cover members 114, 116, 118 enclosing individual red, yellow and green signal lights 32, 34 and 36.

As will be apparent, the present display panel supports both a signal light and alignment light displays. The alignment light display guides the aircraft to its parking position. The signal light display is manually operable by ground personnel to signal the pilot as to advance or stopping of the aircraft with respect to the terminal gate. Both displays are apprehended simultaneously by the aircraft pilot.

In the parking light display system, neon tubes 56, 58 of different colors, for example, red and green, define the line that the pilot of the aircraft must follow in order to align the aircraft properly with the passenger loading bridge or ramp. The pilot occupies the lefthand seat of the aircraft (the Captain's position), aligning the aircraft as it taxis into the parking area, in such a manner that the front neon tube (green) 58, appears directly in front of the rear neon tube 56 (red). The signal light display device is visible simultaneously from the aircraft cockpit. The individual red, yellow and green lights are operated by the ramp agent on the ground, who is in a position to observe the location of the aircraft wheels with respect to the ramp. The activation of the green light by the ramp agent indicates that the gate area is cleared for the aircraft to approach the parking area. The agent activates the yellow light as the aircraft is approaching the stop position. When the aircraft reaches the proper parking location, the ramp agent activates the red light. The red light, thus, indicates to the pilot that the aircraft's brakes should be applied and the aircraft system shut down.

The display panel is characterized by its relatively low cost of manufacture, installation and maintenance. The display panel is simple to operate, requiring only the services of one ground agent and the simultaneous displays are readily discernible by the aircraft Captain. The system is effective under all weather conditions and may be used with all aircraft presently operated by airlines or expected to be in airline operation through the end of the century.

I claim:
1. A display panel for aircraft parking comprising:
 A. an opaque background panel, supported exteriorly of an aircraft terminal building;
 B. a vertically oriented signal light display housing, including red, yellow and green signal lights, said display housing being mounted upon said background panel, such that a portion of said housing extends below said background panel;
 C. a parking light display housing, including a first neon tube of one color and a second neon tube of another color, supported upon said background panel adjacent said signal light display housing, such that said first neon tube and said second neon tube are linearly separated in an axis perpendicular to said background panel, yet aligned in vertical parallel with said red, yellow and green signal lights; and
 D. a source of electricity operably connected to said neon tubes, as an aircraft alignment guide, and operably connected to said signal light, as an aircraft advance and stopping guide.

2. A display panel for aircraft parking as in claim 1, wherein said electrical system includes an "on-off" switch located at an aircraft terminal extensible passenger ramp rotunda and a "red, yellow, green" override switch, located at the extensible ramp wheel carriage.

3. A display panel for aircraft parking as in claim 2, said signal lights being vertically aligned, such that the red light is superposed with respect to said background panel and the yellow and green lights extend below said panel.

4. A display panel for aircraft parking as in claim 3, said first neon tube being of lesser height than said second neon tube, such that an aligned, two-color profile is presented, as the aircraft approaches the display panel in proper alignment with the terminal gate and the first neon tube is offset laterally with respect to said second neon tube, as the aircraft approaches the terminal gate in misalignment.

5. A display panel for aircraft parking as in claim 4, said parking light display housing being mounted upon a support channel, bracketed at a right angle to said background panel, so as to extend said channel and said parking light display housing at right angle to said background panel.

6. A display panel for aircraft parking as in claim 5, said parking light display housing further including pairs of neon tube sockets at each end, so as to complementally support said first neon tube and said second neon tube, and a right angular tube support bracket secured to said housing at each end, so as to engage and rigidize said first neon tube and said second neon tube with respect to each end of said housing.

7. A display panel for aircraft parking as in claim 6, said parking light display housing including a safety wire secured to said support bracket and encircling each said neon tube, so as to fix said tube within said bracket.

8. A display panel for aircraft parking as in claim 7, said display housing further including a support rod mounted at each end of said housing intermediate said tube sockets and a lower safety wire affixed to said support rod, so as to encircle and rigidize each said neon tube with respect to each said support rod.

9. A display panel for aircraft parking as in claim 8, said first neon tube being green and said second neon tube being red.

* * * * *